(12) United States Patent
Yun et al.

(10) Patent No.: US 8,833,564 B1
(45) Date of Patent: Sep. 16, 2014

(54) SYSTEMS AND METHODS FOR REDUCING DUST IN GRANULAR MATERIAL

(71) Applicant: MEMC Electronic Materials, Inc., St. Peters, MO (US)

(72) Inventors: Seok-Min Yun, Cheonan-si (KR); Seong-Su Park, Cheonan (KR); Se-Myung Kim, Cheonan (KR); Won-Jin Choi, Cheonan (KR); Woo-Jin Yoon, Gwangmyeong-si (KR)

(73) Assignee: SunEdison Semiconductor Limited, St. Peters, MO (US)

( * ) Notice: Subject to any disclaimer, the term of this patent is extended or adjusted under 35 U.S.C. 154(b) by 0 days.

(21) Appl. No.: 13/798,706

(22) Filed: Mar. 13, 2013

(51) Int. Cl.
*B07B 4/00* (2006.01)
*B07B 4/02* (2006.01)

(52) U.S. Cl.
CPC ... *B07B 4/00* (2013.01); *B07B 4/02* (2013.01); *Y10S 209/908* (2013.01); *Y10S 209/932* (2013.01)
USPC ........ 209/139.1; 209/639; 209/644; 209/656; 209/908; 209/932

(58) Field of Classification Search
CPC .................................. B07B 4/02; B07B 11/08
USPC ................. 209/644, 639, 656, 138, 141, 132, 209/139.1, 908, 932
See application file for complete search history.

(56) References Cited

U.S. PATENT DOCUMENTS

| | | | |
|---|---|---|---|
| 2,978,103 A * | 4/1961 | Cowher, Sr. .................. | 209/135 |
| 4,857,173 A | 8/1989 | Belk | |
| 4,868,013 A | 9/1989 | Allen | |
| 4,883,687 A | 11/1989 | Gautreaux et al. | |
| 5,294,002 A * | 3/1994 | Moses ........................ | 209/139.2 |
| 5,326,547 A | 7/1994 | Allen et al. | |
| 5,351,832 A * | 10/1994 | Abbott et al. .............. | 209/139.1 |
| 7,291,222 B2 | 11/2007 | Holder et al. | |

FOREIGN PATENT DOCUMENTS

EP  0982081 A1  3/2000
EP  1 900 686 A1  3/2008

OTHER PUBLICATIONS

International Search Report and Written Opinion of the International Searching Authority regarding PCT/US2014/019489 mailed on Jul. 21, 2014; 9 pgs.

* cited by examiner

*Primary Examiner* — Gerald McClain
(74) *Attorney, Agent, or Firm* — Armstrong Teasdale LLP

(57) ABSTRACT

A method of removing dust from granular polysilicon includes introducing a stream of granular polysilicon, dispersing the longitudinal stream of granular polysilicon by redirecting the stream into a radially outward flow having a circular pattern, and introducing a counter flow of gas in an opposite direction to that of the longitudinal stream of granular polysilicon to contact the radially outward flow to separate the dust from the granular polysilicon.

9 Claims, 4 Drawing Sheets

US 8,833,564 B1

SYSTEMS AND METHODS FOR REDUCING DUST IN GRANULAR MATERIAL

FIELD

The field relates to dust in granular material, and more particularly to systems and methods for reducing dust in granular polysilicon used to produce semiconductor and solar wafers.

BACKGROUND

Granular polysilicon, such as chemical vapor deposition grown fluidized bed granular polysilicon, is typically delivered to a crystal growing facility in a shipping container. A conventional container has 300 kg of granular polysilicon. The granular polysilicon is typically sized between 400 and 1400 microns, and any particles sized less than 10 microns is considered dust. As a practical matter, all containers include some amount of dust therein.

When the granular polysilicon is transferred from the container to a feeder system of a crystal grower, the dust is also transferred to the feeder system. From the feeder system, the dust can settle and collect on the surface of the crystal grower hot zone, especially on colder surfaces in advanced "closed" crystal growers. The dust may then contact the crystal or the silicon melt near the crystal/melt interface. Such contact significantly increases the risk of undesirable defects, such as "Loss of Zero Dislocation" (LZD) in high quality semiconductor crystal. Such crystal and the advanced grower used to grow the crystal are found to be "dust sensitive."

While relatively small batches of prior art granular polysilicon have included acceptably low amounts of dust, there has been no reliable system for obtaining such low-dust polysilicon in large quantities and using modern continuous manufacturing methods. Accordingly, improved methods of and apparatus for reducing the dust in the granular polysilicon are needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A first aspect is a method of removing dust from granular polysilicon. The method includes introducing a stream of granular polysilicon into a canister from an inlet positioned opposite a disperser, dispersing the stream of granular polysilicon by redirecting the stream into a radially outward flow by the disperser, and introducing a counter flow of gas in an opposite direction to that of the stream of granular polysilicon to contact the radially outward flow to separate the dust from the granular polysilicon.

Another aspect is a system for removing dust from granular polysilicon. The system includes a canister, an inlet, and a disperser. The canister has a wall defining an interior of the canister and an interior cross-sectional area. The inlet is connected with the canister for the introduction of granular polysilicon into the canister. The inlet has an inlet cross-sectional area that is substantially smaller than the interior cross-sectional area of the canister. The disperser is located within the canister, at a position opposite the inlet, to disperse granular polysilicon introduced through the inlet radially outward toward the wall of the canister.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
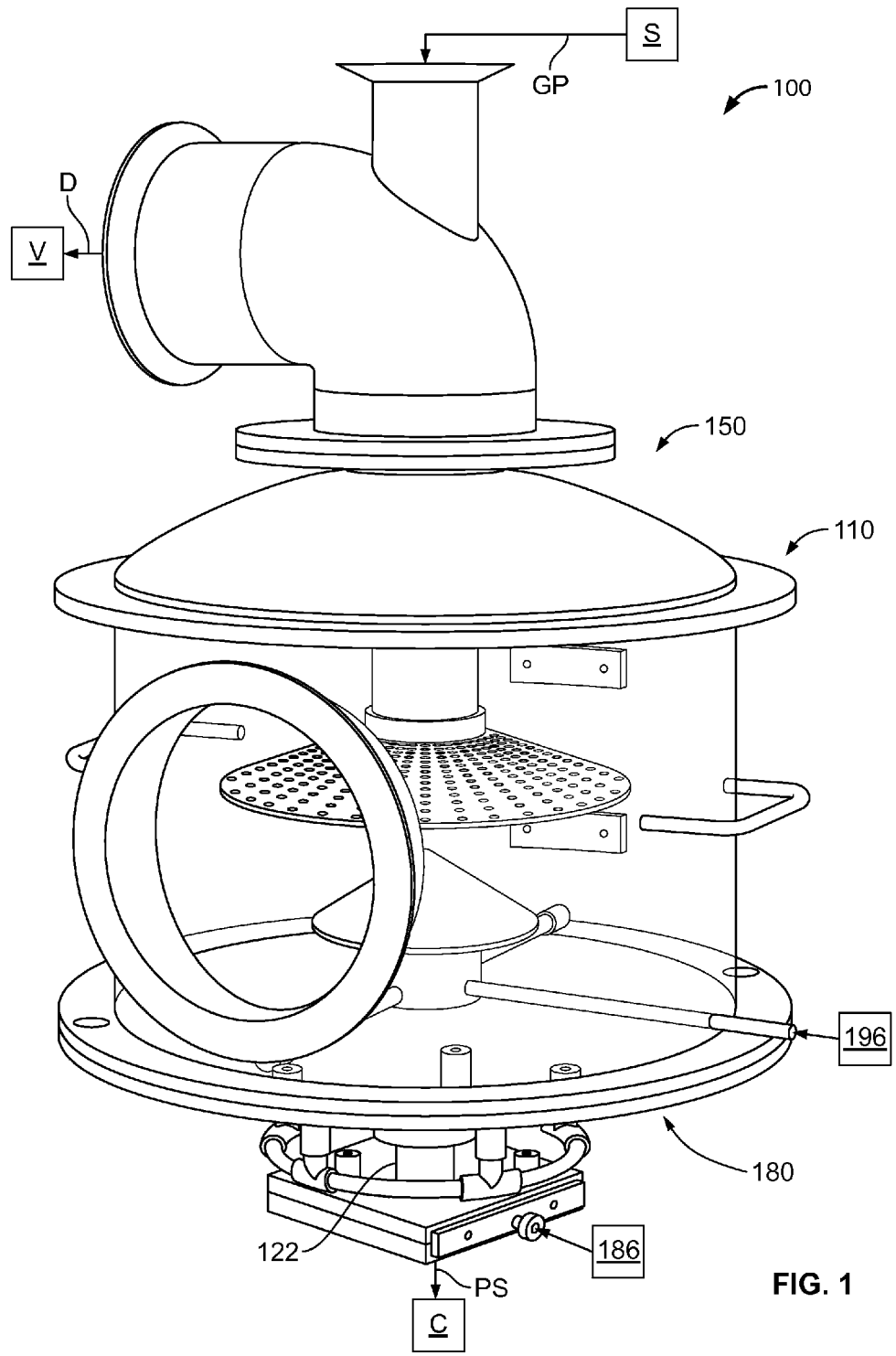
FIG. 1 is a side elevation of a de-dusting system in accordance with one embodiment.
Figure 2:
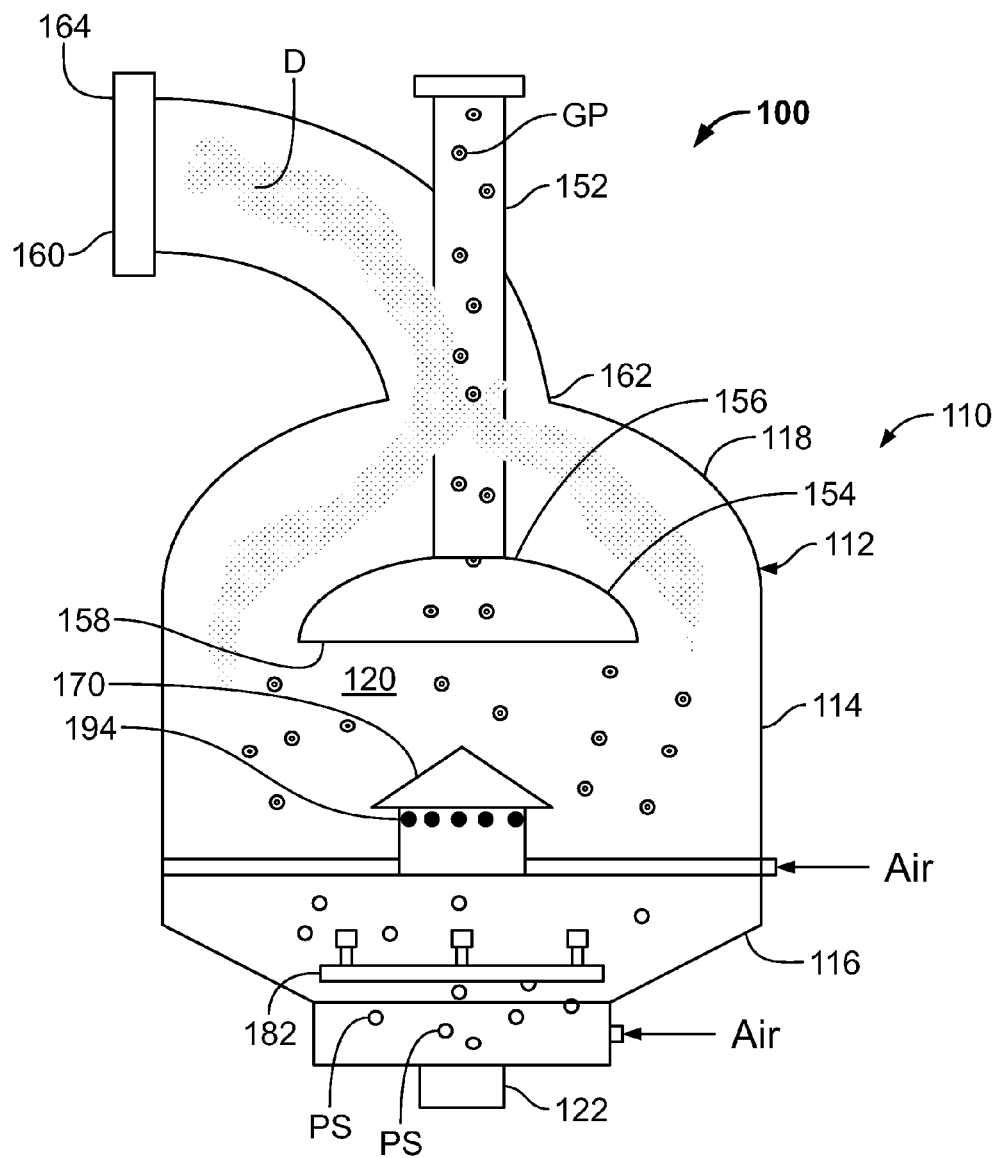
FIG. 2 is a cross-sectional side view of the de-dusting system in accordance with FIG. 1.

Referring to FIGS. 1 and 2, a de-dusting system for use in the removal of dust from granular polysilicon is generally indicated at 100. The system generally includes a source vessel S for containing the granular polysilicon GP, a vacuum source V for pulling dust D away from polysilicon PS, and a collection vessel C for the removal and transportation of the polysilicon. The source vessel contains a bulk supply of granular polysilicon (broadly, granular material). The vacuum source includes a pump (not shown) for drawing the vacuum. The vacuum source may also include a filter (not shown) to inhibit the dust from entering the pump or entering the atmosphere around the system.

The de-dusting system 100 includes a vessel 110, a cowl 150, a disperser 170, and a nozzle array 180. The vessel 110 has a canister 112 with at least one wall 114, a base 116, and a cover 118. Together, the wall 114, base 116, and cover 118 define an interior chamber 120.

The base 116 is concave in shape with a collection port 122 at the lowest point. The concave base 116 allows the de-dusted granular polysilicon or polysilicon PS to fall onto the base and to be collected and removed from the de-dusting system 100 through the collection port 122. The collection port 122 is connected with the collection vessel C.

The cowl 150 is located above the vessel 110 and extends downward through the cover 118. The cowl 150 includes an inlet tube 152 for delivering granular polysilicon GP to the interior chamber 120 of the canister 112 and a dust outlet 160 connected with the vacuum source V for removal of the dust D from within the interior chamber.

The inlet tube 152 extends downward through both the dust outlet 160 and the cover 118 and terminates in a hood 154 located within the internal chamber 120. The hood 154 has a first or inlet opening 156 connected with the inlet tube 152 and a canister opening 158 that opens into the internal chamber 120. The canister opening 158 is substantially larger than the inlet opening 156 to prevent granular polysilicon GP from the inlet tube 152 from being removed from the interior chamber 120 through the dust outlet 160.

The dust outlet 160 mates with the cover 118 and extends upward around the inlet tube 152 such that the inlet tube is at least partially nested within the dust outlet 160. The dust outlet 160 is connected with the vacuum source V to pull the dust from the interior chamber 120 around the circumference of the inlet tube 152.

The dust outlet 160 has a canister end 162 joined to the upper section of the cover 118 and extends at an upward angle to a vacuum end 164 that connects with the vacuum source V. The dust outlet 160 is disposed adjacent the hood 154 and above the canister opening 158 so that the outlet is spaced from the canister opening and the hood is interposed between the dust outlet and the stream of granular polysilicon GP. In this way, the entering stream of granular polysilicon GP is shielded from the vacuum to thereby inhibit the stream of granular polysilicon from being pulled into the dust outlet 160.

The vacuum source V creates a counter flow of gas that is opposite in direction to that of the entering granular polysilicon GP so that only the gas borne dust is pulled by the vacuum. The main function of the hood is to shield the granular polysilicon GP from the vacuum. In some embodiments, the hood may be a tube having a larger diameter than the diameter of the inlet tube, rather than having the dome shaped hood shown in FIG. 2.

A cross-sectional area between the at least one wall 114 of the canister 112 and the canister opening 158 of the hood 154 defines an exit area that is substantially larger than the cross-sectional area of the canister opening of the hood. The dust outlet 160 has a cross-sectional duct area that is substantially smaller than the exit area. The larger exit area provides a decreased flow rate within the canister 112 that increases as the flow is restricted upon entering the dust outlet 160 to aid in the removal of dust D.

In one embodiment, the exact vacuum pressure will vary with factors such as the size of the dust outlet. A suitable method of finding the appropriate vacuum pressure is to begin the process at a vacuum pressure that does not allow the granular polysilicon to flow through the canister and then reduce the vacuum pressure until the polysilicon flows through the canister at a satisfactory rate that allows for both efficient processing and significant reduction of dust in the polysilicon. In another embodiment, the vacuum pressure is adjusted by either a throttle valve or air regulator while the operator visually monitors the interior chamber 120. The vacuum pressure may vary for different systems. In some embodiments, the vacuum pressure is between approximately 2.25 kPa and approximately 4.0 kPa, though other vacuum pressures may be used.

The disperser 170 is located in spaced relation, directly underneath the center of the inlet tube 152 to disperse the granular polysilicon GP introduced through the inlet tube 152 radially outward toward the wall 114 of the canister 112. The shape and location of the disperser 170 provides redirection of the flow of the granular polysilicon GP entering the interior chamber 120 through the inlet tube 152 into multiple directions to thereby encourage dust D entrained in the polysilicon PS or attached to the granules to separate from the polysilicon PS and become gas borne. The gas borne dust D is pulled upward out of the interior chamber 120 by the vacuum source V. In some embodiments, more than one disperser may be used.

The disperser 170 is conical in shape to disperse the flow of the granular polysilicon from the inlet tube 152 in a radially outward direction and towards the wall 114 of the canister 112. The redirected flow of granular silicon creates a circular pattern as the redirected flow extends radially outward. In some embodiments, the disperser may have other shapes capable of redirecting the entering granular polysilicon into multiple directions. In these embodiments, the redirected flow may form patterns that are not circular.

Figure 3:
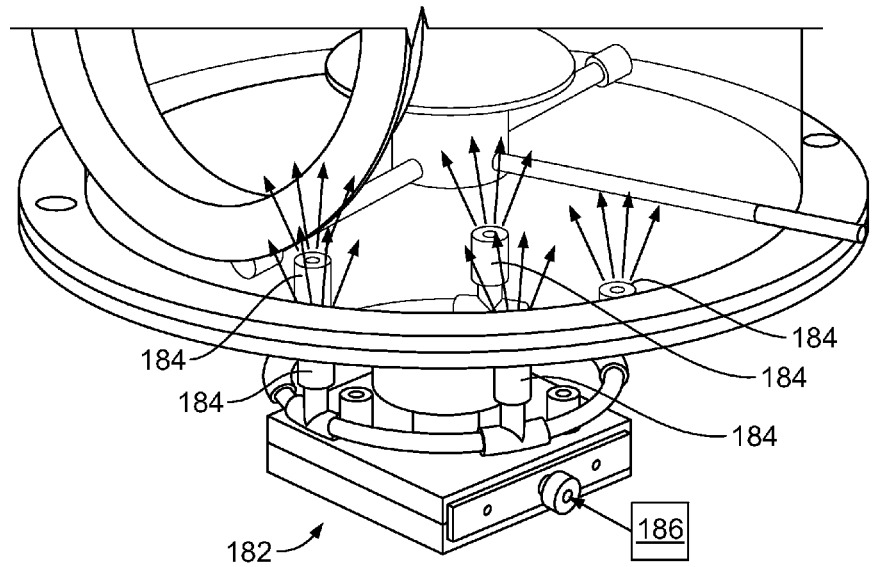
FIG. 3 is a front elevation view of a nozzle set of the de-dusting system in accordance with FIGS. 1-2.

With additional reference to FIG. 3, the nozzle array 180 includes a first gas inlet 182 and five cone gas nozzles 184 for providing a counter flow of gas that is opposite the direction of the entering granular polysilicon GP. The first gas inlet 182 is connected with a first gas source 186. The first gas is suitably nitrogen or another inert gas. The rate of the counter flow of gas is significant enough to separate the dust D from the granular polysilicon GP, but not enough to prevent the polysilicon PS from falling to the base 116. The first gas inlet 182 is located adjacent the disperser 170 and directed toward the inlet tube 152. In some embodiments more or less gas nozzles may be used. In some embodiments, the gas nozzles may be arranged in any of a variety of patterns that complement the shape of the disperser.

Figure 4:
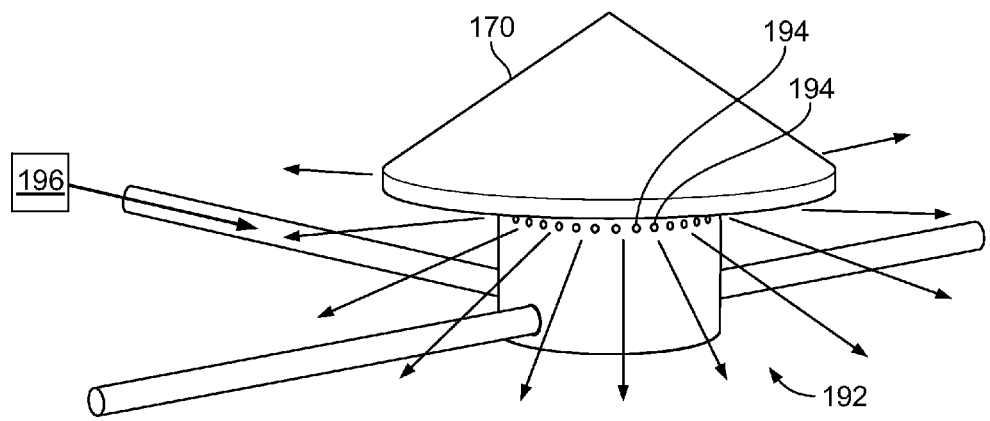
FIG. 4 is a front elevation view of a disperser of the de-dusting system in accordance with FIGS. 1-2.

With additional reference to FIG. 4, the nozzle array 180 includes a second gas inlet 192 and multiple gas ports 194 spaced about the underside of the disperser 170 for providing a gas curtain/crossflow in a direction perpendicular to the counter flow of gas from the first gas inlet 182. The second gas inlet 192 is connected with a second gas source 196 of nitrogen or another inert gas. The crossflow of gas increases the turbulence with the canister 112. In some embodiments, the first gas source and the second gas source are the same source.

The second gas inlet 192 may be directed toward the at least one wall 114 of the canister 112 from a location within the canister. In some embodiments, the second gas inlet 192 may be directed toward the disperser 170 for creating a crossflow that is in an opposite direction to that of the redirected flow.

Method

In a method of removing dust from granular polysilicon GP in a source vessel S, the granular polysilicon is transferred from the source vessel, through an inlet tube 152, into a canister 112 having a disperser 170 positioned at a location opposite that of the inlet tube. The granular polysilicon GP is introduced into an interior chamber 120 of the canister 112 as a flowing stream having a longitudinal direction. The granular polysilicon GP is dispersed about the interior chamber 120 by the disperser 170.

The disperser 170 redirects the longitudinal stream into a radially outward flow directed towards a wall 114 of the canister 112. The radially outward flow has a circular pattern.

A counter flow of gas is introduced into the interior chamber 120 from a first gas inlet 182 of a nozzle array 180 located below the disperser 170. The counter flow of gas is in an opposite direction to that of the longitudinal stream of granular polysilicon GP entering the canister 112.

A vacuum source V is connected with a dust outlet 160 to aid in the counter flow of gas. In some embodiments, the counter flow of gas is formed by either the vacuum source or the nozzle array. The dust outlet 160 is spaced above the inlet tube 152. The inlet tube 152 terminates in a hood 154 to prevent a reverse flow of the granular polysilicon GP from the inlet tube 152 from being removed through the dust outlet 160 as the granular polysilicon is introduced into the interior chamber 120.

The counter flow of gas separates the dust D from the polysilicon PS as the gas flows through the radially outward flow of granular polysilicon GP. The vacuum source V creates a vacuum to aid in the removal of the dust D from the interior chamber 120 by pulling the separated dust through the dust outlet 160.

The turbulence within the interior chamber 120 is increased by the introduction of a cross-flow of gas from a second gas inlet 192 located below the disperser 170 and directed radially outward about the disperser 170. The cross-flow of gas creates a curtain to prevent dust D from exiting the internal chamber 120 through a collection port 122 located in a base 116 of the canister 112, under the disperser 170.

The counter flow of gas has a flow rate that is selected to separate the dust D from the granular polysilicon GP while allowing the de-dusted polysilicon PS to pass therethrough. After the polysilicon PS passes through the counter flow of gas, the polysilicon falls to a base 116 of the canister 112. The base 116 has a concave shape and is connected with the collection port 122. The polysilicon PS then travels along the base 116 and is removed from the canister 112 through the collection port 122. As the polysilicon PS is removed, the size of the polysilicon particles being removed is measured and the counter flow of gas is adjusted to regulate the size of the polysilicon passing through the canister 112. The polysilicon PS is then packaged in a collection vessel C after being de-dusted.

To avoid contamination of the granular polysilicon handled by the system, all system components in contact with granular polysilicon at a high velocity are made of, formed, or coated with materials selected to maintain the non-contaminating performance of the system. Such materials include, but are not limited to, quartz coatings, silicon coatings, solid silicon and solid silicon carbide. Typically, the coatings are applied to a stainless steel substrate. Other materials suitable for non-contaminating performance are also contemplated as within the scope of the present invention.

For low velocity portions of the apparatus, TEFLON® or TEFZEL® coatings (available from E. I. du Pont de Nemours and Company of Wilmington, Del., U.S.A.) provide acceptable non-contaminating performance. The wall 114 of the canister 112 may be coated with TEFZEL®. Use of the above embodiments enables significant reduction in the time spent de-dusting, e.g., reducing the time required to de-dust the granular polysilicon by at least 25%, at least 50% or even as much as 75%. Additionally, use of the system described herein provides a high degree of dust removal efficiency. This reduction in dust particles and improved efficiency not only increases the overall production of the crystal forming system, but also lowers overall operational costs.

In a method of measuring the relative amount of dust in a flow of granular polysilicon, the cleanliness of the mixing container is verified by shaking 50 ml of water in the mixing container and then transferring the water into a sample tube and measure the turbidity. Turbidity is a measurement of how much light is scattered by a sample. As a result, the sample tube is kept clean and free of scratches. The sample tube is dried before placing the sample in the well to avoid damaging the electronics. After the sample is placed into the sample tube, a well cap is put over the sample tube to block light from the room from interfering with the instrument.

If the turbidity value is greater than 2 NTU, calibration is verified with the standard and/or reclean the mixing container. Once the turbidity value is verified to be less than 2 NTU, add 2.0 grams of a sample of granular polysilicon and 50 milliliters of clean water to the mixing container. The sample is shaken vigorously for 10 seconds. The visual appearance of the sample solution is checked. If the sample solution is darker than the 10-mg dust standard, the sample is too concentrated and will not read properly, in which case a sample solution having a lower weight of polysilicon is prepared.

Some of the water is poured into a clean measurement tube. A dry measurement tube is placed in the sample well and the turbidity is recorded after 10 seconds. The NTU is used to calibrate the dust calibration curve to determine the level of dust in the sample. If the NTU is less than 40 or greater than 250, a different sample weight is selected to be in the linear portion of the calibration curve. Efficiency of dust removal can be determined by measuring the dust level on samples before and then after the de-dusting process.

The prior art has failed to recognize the extent to which the dust affects the yield of high quality semiconductor crystal, and the extent to which the dust affects advanced crystal growers. When the granular polysilicon is transferred from the container to a feeder system of a crystal grower, the dust is also transferred to the feeder system. From the feeder system, the dust can settle and collect on the surface of the crystal grower hot zone, especially on colder surfaces in advanced "closed" crystal growers. The dust may then contact the crystal or the silicon melt near the crystal/melt interface. Such contact significantly increases the risk of undesirable defects, such as "Loss of Zero Dislocation" (LZD) in high quality semiconductor crystal. Such crystal and the advanced grower used to grow the crystal are found to be "dust sensitive."

The dust removal methods could be performed during manufacturing to ensure that substantially all of the source vessel delivered to the crystal pulling facility is below the dust specification. The dust removal methods have proven to be more effective than "gas classification," which is typically used in granular polysilicon manufacturing. Applicants found that gas classification does not filter out a sufficient amount of the dust.

EXAMPLE

Figure 5:
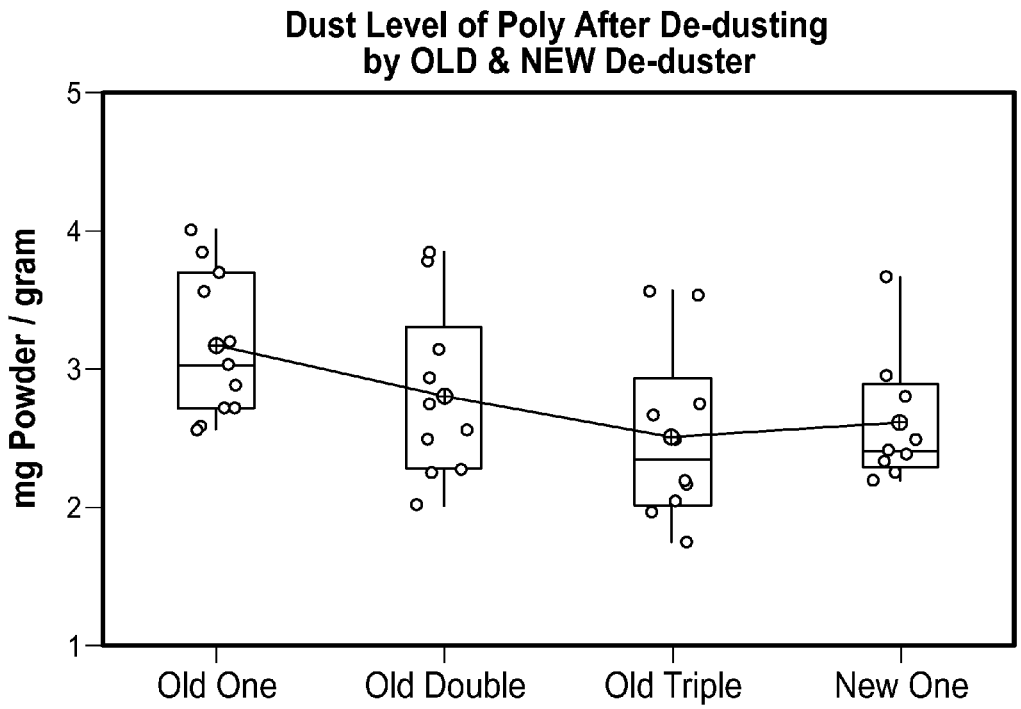
FIG. 5 is a graph plotting measured dust levels after de-dusting.
Figure 6:
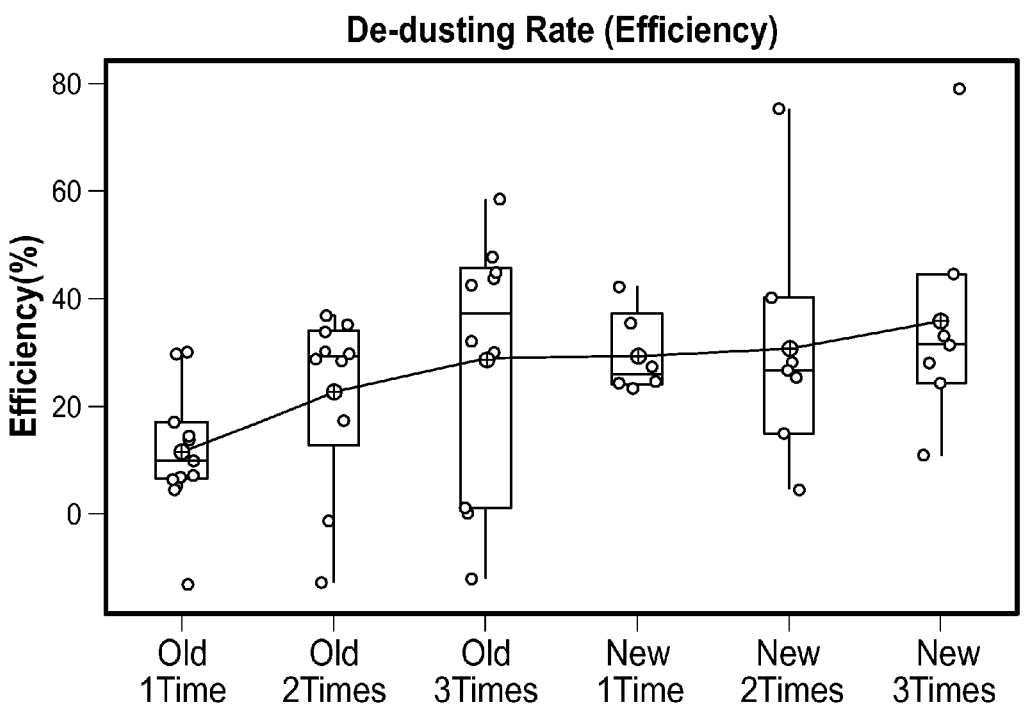
FIG. 6 is a graph plotting the efficiency of de-dusters.

In an example, granular polysilicon was de-dusted several times using both an old de-duster system and the above embodiment of the de-dusting system. The dust level of polysilicon after one de-dusting cycle of the above embodiment of the de-dusting system is similar to de-dusted polysilicon that had passed through the old de-dusting system after three cycles. This result is proven by the dust levels shown in FIG. 5. FIG. 6 shows that the de-dusting efficiency is significantly higher in the above embodiment of the de-dusting system than in the old de-dusting system.

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of removing dust from granular polysilicon, the method comprising:
    introducing a stream of granular polysilicon into a canister from an inlet positioned opposite a disperser;
    dispersing the stream of granular polysilicon by redirecting the stream into a radially outward flow by the disperser;

introducing a counter flow of gas in an opposite direction to that of the stream of granular polysilicon to contact the radially outward flow to separate the dust from the granular polysilicon;

wherein the inlet is connected with a domed hood located within the canister to prevent reversed flow of the stream of granular polysilicon from the inlet into a dust outlet;

introducing a cross-flow of gas to increase turbulence of the radially outward flow radially outward from a center axis of the canister from below the domed hood and the inlet.

2. The method of claim 1, further comprising the step of pulling a vacuum through the dust outlet located above the inlet to pull the dust from the granular polysilicon.

3. The method of claim 1, further comprising the step of packaging the granular polysilicon after the dust has been removed.

4. The method of claim 1, wherein the domed hood has a first opening with a first cross-sectional area adjacent the inlet that is substantially larger than a second cross-sectional area of a second opening adjacent the interior of the canister.

5. The method of claim 4, wherein the canister has an interior cross-sectional area that is substantially larger than the second cross-sectional area.

6. The method of claim 1, wherein the disperser is conically shaped to redirect the stream of granular polysilicon radially outward in a circular pattern.

7. The method of claim 1, wherein the counter flow of gas is introduced from a position below the disperser.

8. The method of claim 1, further comprising the step of adjusting the counter flow of gas to regulate the size of granular polysilicon passing through the canister.

9. The method of claim 1, further comprising the step of removing the granular polysilicon from the canister after removal of the dust through a collection port.

* * * * *